United States Patent
Pu et al.

(10) Patent No.: US 11,473,005 B2
(45) Date of Patent: Oct. 18, 2022

(54) IN-SITU EMULSIFICATION AND VISCOSITY INCREASE SYSTEM WITH HIGH PHASE CHANGE POINT AND APPLICATION THEREOF IN WATER-FLOODING OIL RESERVOIR

(71) Applicant: Southwest Petroleum University, Sichuan (CN)

(72) Inventors: Wanfen Pu, Sichuan (CN); Rui Liu, Sichuan (CN); Shishi Pang, Sichuan (CN); Lin Sun, Sichuan (CN); Daijun Du, Sichuan (CN)

(73) Assignee: SOUTHWEST PETROLEUM UNIVERSITY, Sichuan (CN)

( * ) Notice: Subject to any disclaimer, the term of this patent is extended or adjusted under 35 U.S.C. 154(b) by 0 days.

(21) Appl. No.: 16/961,192

(22) PCT Filed: Jul. 30, 2019

(86) PCT No.: PCT/CN2019/098262
§ 371 (c)(1),
(2) Date: Jul. 9, 2020

(87) PCT Pub. No.: WO2020/237818
PCT Pub. Date: Dec. 3, 2020

(65) Prior Publication Data
US 2021/0163814 A1    Jun. 3, 2021

(30) Foreign Application Priority Data

May 31, 2019 (CN) .......................... 201910470177.0

(51) Int. Cl.
*E21B 43/26* (2006.01)
*C09K 8/584* (2006.01)

(52) U.S. Cl.
CPC .............. *C09K 8/584* (2013.01); *E21B 43/26* (2013.01)

(58) Field of Classification Search
None
See application file for complete search history.

(56) References Cited

U.S. PATENT DOCUMENTS

| | | | | |
|---|---|---|---|---|
| 5,927,404 A | * | 7/1999 | Bragg | E21B 43/16 166/275 |
| 6,068,054 A | * | 5/2000 | Bragg | C09K 8/26 166/270 |

(Continued)

FOREIGN PATENT DOCUMENTS

CN    101037593 A    9/2007

OTHER PUBLICATIONS

Cheng "Surface modification of nano-TiN by using silane coupling agent" Materials Science-Poland, 32(2), 2014, pp. 214-219 (Year: 2014).*

(Continued)

*Primary Examiner* — Charles R Nold
(74) *Attorney, Agent, or Firm* — Muncy, Geissler, Olds & Lowe, P.C.

(57) ABSTRACT

The present invention discloses an in-situ emulsification and viscosity increase system with a high phase change point. The system consists of the following components in percentage by weight: 0.2~0.5% of water-soluble surfactant, 0.2~1.5% of oil-soluble surfactant, 0.02~0.5% of lipophilic colloidal particles, 0.02~0.2% of carrying agent and the balance of mineralized water. The water-soluble surfactant is one of or a combination of petroleum sulfonate, cocamidopropyl betaine, fatty alcohol ether sulfonate, alkanolamide and alkyl glycoside; the oil-soluble surfactant is one of or a combination of propylene glycol monostearate, fatty glyceride, polyoxyethylene sorbitan monostearate, polyoxy- (Continued)

ethylene fatty alcohol ether, oleic diethanolamide, dodecylamine, octadecyl primary amine, sodium oleate and petroleum acid; the lipophilic colloidal particles are one of liquid paraffin, graphite powder and polyhedral oligomeric silsesquioxane; the carrying agent is one of carboxymethyl-β-cyclodextrin, chitosan quaternary ammonium salt, chitosan hydrochloride, xanthan gum and guar gum. The system is used for water-flooding oil reservoirs and can significantly improve the development effect of water-flooding heavy oil reservoirs.

3 Claims, 2 Drawing Sheets

(56) References Cited

U.S. PATENT DOCUMENTS

| | | | | |
|---|---|---|---|---|
| 6,988,550 | B2 * | 1/2006 | Bragg | C09K 8/265 166/275 |
| 2003/0139299 | A1 * | 7/2003 | Bragg | C09K 8/265 507/200 |
| 2012/0090845 | A1 * | 4/2012 | Huang | C09K 8/74 166/304 |
| 2015/0361327 | A1 * | 12/2015 | Yang | C09K 8/588 507/207 |
| 2017/0037296 | A1 * | 2/2017 | Kimura | E21B 43/16 |

OTHER PUBLICATIONS

Seright R., et al.; "Stability of Partially Hydrolyzed Polyacrylamides at Elevated Temperatures in the Absence of Divalent Cations"; SPE 121460, Society of Petroleum Engineers, 2009 SPE International Symposium on Oilfield Chemistry, The Woodlands, Texas Apr. 20-22, 2009, pp. 1-15.

Abubakar Abubakar Umar, et al. "A review of petroleum emulsions and recent progress on water-in-crude oil emulsions stabilized by natural surfactants and solids;" Journal of Petroleum Science and Engineering, vol. 165, Mar. 6, 2018, pp. 673-690.

Wanfen Pu, et al; "Application potential of in situ emulsion flooding in the high-temperature and high-salinity reservoir": Journal of Dispersion Science and Technology; Taylor & Francis Group, https://doi.org/10.1080/01932691.2018.1491858; Sep. 11, 2018; pp. 1-9.

* cited by examiner

IN-SITU EMULSIFICATION AND VISCOSITY INCREASE SYSTEM WITH HIGH PHASE CHANGE POINT AND APPLICATION THEREOF IN WATER-FLOODING OIL RESERVOIR

TECHNICAL FIELD

The present invention relates to an in-situ emulsification and viscosity increase system with a high phase change point and an application thereof in water-flooding oil reservoirs, belonging to the technical field of oilfield chemistry and improved water flooding.

BACKGROUND ART

In an oil reservoir developed by water injection, the fluidity of water and oil varies greatly during water-flooding development, and a displacement front edge is easy to form viscous fingering, resulting in low water-flooding efficiency and high residual oil saturation. The polymer flooding technology mainly focusing on fluid control has developed rapidly and has become the second largest technology in the world for enhanced oil recovery (EOR) (Koottungal L. 2014 Worldwide EOR Survey[J]. Oil and Gas Journal, 2014, 112(4):79-91). China is the country with the most extensive application of chemical flooding. The oil production of chemical flooding is about 10.1% of China's total oil production, accounting for more than 60% of the production of global chemical flooding. A polymer used in most oilfield chemical flooding in the world is partially hydrolyzed polyacrylamide (HPAM). HPAM exists in mineral water rich in inorganic cations such as $Na^+$, $Ca^{2+}$, and $Mg^{2+}$. Inorganic cations shield negative charges on polymer chains, causing polymer strands to curl and the solution viscosity to drop sharply (Seright R., Campbell A., Mozley P., Han P. Stability of partially hydrolyzed polyacrylamides at elevated temperatures in the absence of divalent cations [J].SPE Journal, 2010, 15(02):341-348). In order to improve the performances of polymers for oil displacement, oilfield chemists introduce temperature- and salt-resistant functional monomers on the polymer main chain or side chains or a special structure control method to increase the viscosity, temperature resistance, shear resistance and other properties of polymers, wherein the more typical polymers are hydrophobically associated, comb-shaped, star-shaped, and hyperbranched polymers (Chen Xirong, Huang Fengxing. Research Progress of Temperature-resistant and Salt-resistant Water-soluble Polymers for Oil Displacement [J]. Petrochemical Industry, 2009, 10: 1132-1137). However, the above polymers mainly solve the problem of high salt. For high-temperature oil reservoirs with a temperature above 90° C., polymers with amide groups and carboxylic acids as main functional units still face the constraints from degradation at high temperatures. In addition, polymers for oil displacement with hydrophobic groups are difficult to dissolve in highly mineralized water. In addition, offshore oilfield platforms also impose greater restrictions on polymer flooding owing to large well spacing, small space, and difficulty in separation of produced fluids.

In view of the problem that an improved water flooding technology represented by polymers for high-temperature and high-salt oil reservoirs is not suitable for applications in high-temperature (>90° C.) and high-salt oil reservoirs, some scholars have proposed an emulsification and viscosity increase type oil displacement system. This system rapidly forms an oil-external emulsion with crude oil under certain shear conditions, wherein the oil-external emulsion has a large particle size, has the characteristics of kinetic stability and thermodynamic instability, is easy to demulsify, and thus has the viscosity higher than that of crude oil in the case of high water-content oil (Cao Xulong, Ma Baodong, Zhang Jichao. Development of Viscosity Increase type Emulsion Oil Displacement System for Extra High Temperature Oil Reservoirs [J]. Petroleum Geology and Recovery Rate, 2016, 23, 68-73). There are two ways to form emulsions: spontaneous emulsification and self-emulsification. Spontaneous emulsification is also known as "true" spontaneous emulsification, in which oil and water phases are emulsified without any external energy, and since oil and water have different properties, the emulsion stability varies from minutes to weeks. Self-emulsification is the formation of an emulsion under the action of mechanical forces (such as vibration, mixing, ultrasound, shear) in the presence of a surfactant, and the free energy to form the emulsion is very small or even negative, which manifests itself as a thermodynamic dynamic spontaneous process. According to the Gibbs adsorption theorem, the surfactant is adsorbed at an oil-water interface to form an interfacial film. The lower the tension at the oil-water interface, the lower the Gibbs' free adsorption capacity and the easier it is to form an emulsion. The viscosity of the emulsion is related to the type of the emulsion. Generally, the viscosity of a water-external emulsion is higher than the viscosity of water and lower than the viscosity of degassed crude oil. The viscosity of an oil-external emulsion is higher than the viscosity of crude oil. However, in water-flooding oil reservoirs, oil saturation with high water-flooding sweep degree is low, and oil saturation with low water-flooding sweep degree is high. Field practice shows that a water-in-oil emulsion is formed in a low water-content and low-permeability area (high oil saturation) during water flooding of heavy oil, and an oil-in-water emulsion is formed in a high water-content and high-permeability area (low oil saturation). This, in turn, exacerbates the heterogeneity of a formation. On the other hand, with the advancement of an oil-water front edge, the water content of the reservoir increases continuously, and a water-external emulsion is easily formed in the high-permeability area. In addition, the viscosity decreases continuously, and the viscosity of an oil-external phase in the lower-permeability area increases, and viscous fingering will be formed to exacerbate the instability of a displacement front edge. Therefore, controlling the phase state of the emulsion not to reverse within a wide range of water content is the basis for achieving stable and efficient displacement of the front edge of the emulsion.

According to Ostwald's pure geometric point of view, when a volume ratio of two phases is between 0.26 and 0.74, a water-external or oil-external emulsion can be formed. When a volume fraction of oil and water phases is less than 0.26 or greater than 0.74, the emulsion will undergo a phase change. Ions contained in crude oil such as silicon dioxide, clay, and iron oxide are hydrophilic in nature, but become lipophilic during long-term contact with crude oil. Small-scale oily particles help improve the stability of the water-in-oil emulsion. These and asphaltene compounds can form the water-in-oil emulsion more stably. Adsorption points on the particle surfaces require asphaltene saturation. Asphaltene and gum are natural amphiphilic materials. The highest molecular weight gum and asphaltene stabilize the interface, and the low molecular weight asphaltene and gum reduce the stability of an emulsion (rapid separation of medium and low molecular weights). The characteristics of polar and non-polar groups of natural amphiphilic substances make them not completely dissolved in any solvent and tend to line up at an oil-water interface. An emulsion containing stable solid phase particles is referred to as a Pickering emulsion. The Pickering emulsion can realize the formation and stabilization of a high internal phase emulsion. Therefore, the problem that the oil-external emulsion does not undergo phase change in the condition of a wide water-content formation is theoretically solved. However, the viscosity of the Pickering emulsion is generally large, especially for heavy oil reservoirs. The viscosity of an oil-external Picking emulsion can reach several times to a dozen times the viscosity of crude oil (Uma A, Saaid I, Sulaimon A, et al. A review of petroleum emulsions and recent progress on water-in-crude oil emulsions stabilized by natural surfactants and solids[J]. Journal of Petroleum Science and Engineering, 2018, 165:673-690), which results in difficulty in propagation in the formation and high injection pressure, thereby seriously affecting the production. Therefore, how to control the viscosity of the high water-content oil-external emulsion is the key to favorable and efficient displacement of the emulsification and viscosity increase system containing high internal phase in water-flooding oil reservoirs.

SUMMARY OF THE INVENTION

Technical Problem

An object of the present invention is to provide an in-situ emulsification and viscosity increase system with a high phase change point. This system forms a water-in-oil emulsion that is hydrodynamically stable and thermodynamically unstable under a wide range of aqueous conditions, and has the advantages of cheap and easily available raw materials, reliable preparation principle, broad mine field application prospect, and outstanding economic benefits.

Another object of the present invention is to provide an application of the in-situ emulsification and viscosity increase system with a high phase change point in water-flooding oil reservoirs. The in-situ emulsification and viscosity increase system with a high phase change point is suitable for water flooding oil reservoirs, and is not affected by a temperature and a mineralization degree of oil reservoirs. This system has a wide application range for oil reservoirs, is a new method to improve water flooding technology and can significantly improve the development effect of water-flooding heavy oil reservoirs.

Solution of Problems

Technical Solution

To fulfill the above technical objects, the present invention adopts the following technical solutions.

The in-situ emulsification and viscosity increase system with a high phase change point consists of water-soluble surfactant+oil-soluble surfactant (hereinafter referred to as water-soluble and oil-soluble composite surfactant)+lipophilic colloidal particles+carrying agent. The system is directly dissolved or dispersed with mineralized water and pumped into a formation. When the water content is 90%, the water-soluble and oil-soluble composite surfactant cooperates with the lipophilic colloidal particles to promote self-emulsification of crude oil to form a water-in-oil emulsion. When the water content is ≥70%, a high-internal-phase water-in-oil Pickering emulsion having a relatively high viscosity and a water-in-oil emulsion are formed. The dense accumulation of large- and small-scale emulsions in a three-dimensional space reflects the controllability of the emulsion's viscosity, which can effectively control the fluidity of a high-permeability area (low oil saturation), expand the sweep coefficient, and achieve efficient displacement in a low-permeability area (high oil saturation). Therefore, this system is of a new method to improve the water flooding technology, which greatly improves the recovery rates of water-flooding oil reservoirs.

The in-situ emulsification and viscosity increase system with a high phase change point includes a water-soluble surfactant, an oil-soluble surfactant, lipophilic colloidal particles and a carrying agent that form (ultra) low interfacial tension (10-2 mN/m and below) with crude oil. The system consists of the following components in percentage by weight:

0.2~0.5% of water-soluble surfactant;
0.2~1.5% of oil-soluble surfactant;
0.02~0.5% of lipophilic colloidal particles,
0.02~0.2% of carrying agent; and
the balance of mineralized water.

The water-soluble surfactant is one of or a combination of petroleum sulfonate, cocamidopropyl betaine, fatty alcohol ether sulfonate, alkanolamide and alkyl glycoside, and has an oil-water interfacial tension reaching the order of 10-2 mN/m and below.

The oil-soluble surfactant is one of or a combination of propylene glycol monostearate, fatty glyceride, polyoxyethylene sorbitan monostearate, polyoxyethylene fatty alcohol ether, oleic diethanolamide, dodecylamine, octadecyl primary amine, sodium oleate and petroleum acid.

The lipophilic colloidal particles are one of liquid paraffin, graphite powder and polyhedral oligomeric silsesquioxane.

The carrying agent is one of carboxymethyl-β-cyclodextrin, chitosan quaternary ammonium salt, chitosan hydrochloride, xanthan gum and guar gum.

The above substances are all commercially available.

In the in-situ emulsification and viscosity increase system with a high phase change point, in percentage by weight, the water-soluble surfactant is preferably 0.25%, the oil-soluble surfactant is preferably 0.45%, the lipophilic colloidal particles are preferably 0.05%, the carrying agent is preferably 0.05%, and the balance is mineralized water.

An application of the in-situ emulsification and viscosity increase system with a high phase change point in water-flooding oil reservoirs is also provided. The properties of the oil reservoir are as follows:

the oil reservoir is a water-flooding oil reservoir in which the temperature is up to 120° C., the mineralization degree of the mineralized water is up to 20×104 mg/L, and the viscosity of formation crude oil is less than 500 mPa·s.

The in-situ emulsification and viscosity increase system with a high phase change point provided by the present invention is directly dissolved or dispersed with the mineralized water, and has good injectability. When the water content is 90%, the water-soluble and oil-soluble composite surfactant cooperates with the lipophilic colloidal particles to form a water-in-oil emulsion. When the water content is ≥70%, a small-scale water-in-oil emulsion formed by the water-soluble and oil-soluble composite surfactant and a large-scale high-internal-phase water-in-oil Pickering emulsion formed by the water-soluble and oil-soluble composite surfactant+lipophilic colloidal particles coexist, which does not conform to Ostwald's pure geometric theory, and realize the dense accumulation of large- and small-scale emulsions in a three-dimensional space, and achieve high emulsion viscosity; Therefore, this system can effectively control the fluidity of a high-permeability area, expand the sweep coefficient, and achieve intelligent displacement in high and low permeability areas. Therefore, this system is of a new method to improve the water flooding technology, which greatly improves the recovery rates of water-flooding oil reservoirs.

BENEFICIAL EFFECTS OF INVENTION

Beneficial Effects

Compared with the prior art, the present invention has the following beneficial effects:

the in-situ emulsification and viscosity increase system with a high phase change point is directly dissolved or dispersed with the mineralized water to form a colloidal dispersion system with excellent suspension and stability;

the viscosity of the in-situ emulsification and viscosity increase system with a high phase change point is slightly higher than the viscosity of the mineralized water, and thus the in-situ emulsification and viscosity increase system with a high phase change point can be injected well into all water-injectable oil reservoirs;

the interfacial tension between the in-situ emulsification and viscosity increase system with a high phase change point and the heavy oil is up to the order of 10-2 mN/m and below;

the in-situ emulsification and viscosity increase system with a high phase change point intelligently identifies an oil-water interface, and the injection timing is suitable for all low-water-content, medium-high-water-content, and high-water-content stages in oil fields;

the present invention is suitable for water-flooding oil reservoirs with a viscosity of less than 500 mPa·s, and the coverage of the oil reservoirs is very wide; and all raw materials are purchased from the market, the economic benefits are outstanding, the recovery rate of water-flooding oil reservoirs can be increased significantly, and the application prospect is particularly broad.

BRIEF DESCRIPTION OF THE DRAWINGS

Description of the Drawings

Figure 1:
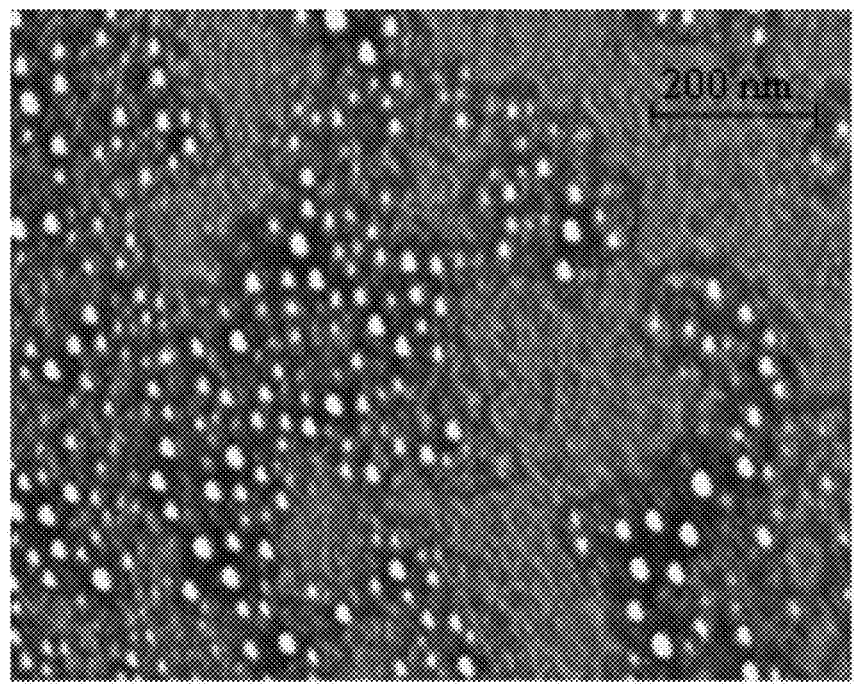

FIG. 1 is a micrograph of an in-situ emulsification and viscosity increase system with a high phase change point.

Figure 2:
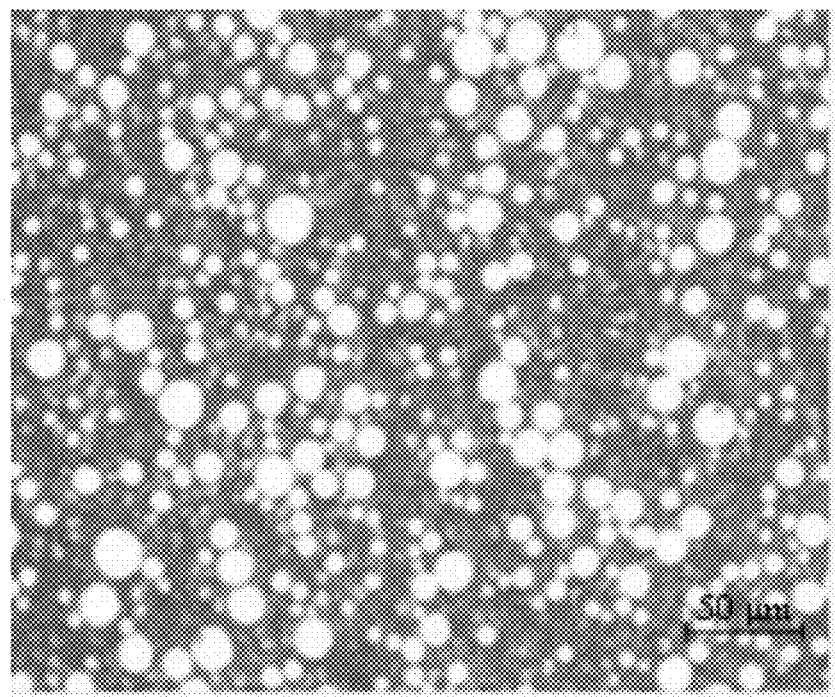

FIG. 2 is a micrograph in which the in-situ emulsification and viscosity increase system with a high phase change point forms an emulsion.

Figure 3:
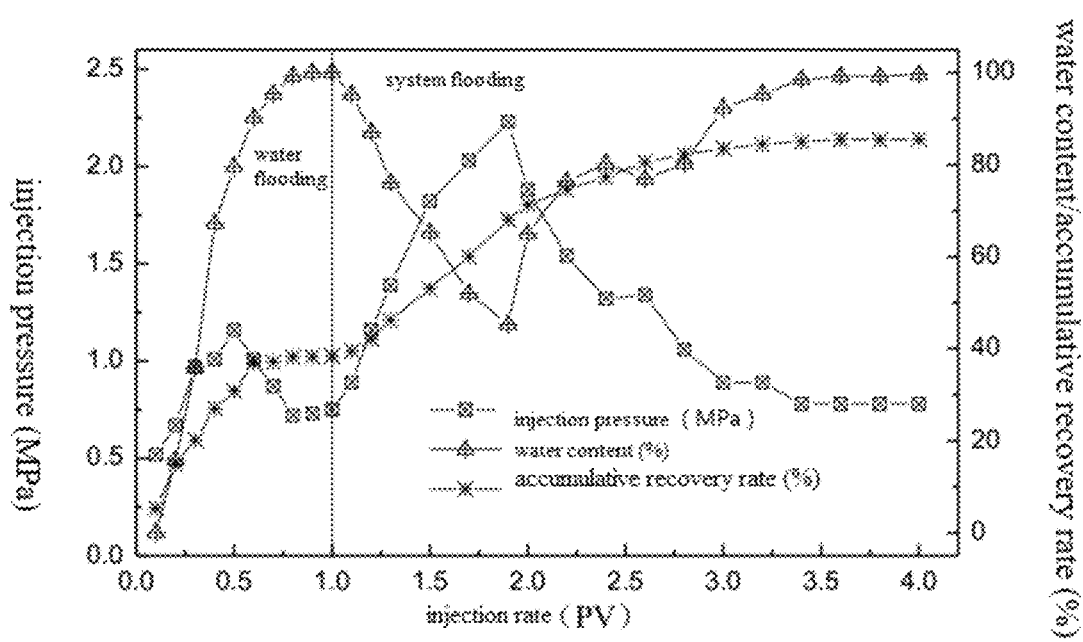

FIG. 3 is diagram showing an oil displacement effect of the in-situ emulsification and viscosity increase system with a high phase change point.

EMBODIMENTS OF INVENTION

Detailed Description

The present invention is further described below with reference to the accompanying drawings and examples, for those skilled in the art to understand the present invention. However, it should be clear that the present invention is not limited to the scope of the specific embodiments. To those of ordinary skill in the art, as long as various changes are within the spirit and scope of the present invention as defined and determined by the appended claims, they are all protected.

The following detailed descriptions are illustrative, and unless otherwise indicated, all technical and scientific terms used herein have the same meanings as commonly understood by those of ordinary skill in the art to which this application belongs.

The preparation of an in-situ emulsification and viscosity increase system with a high phase change point includes the following steps: preparing 99.2% of mineralized water with a mineralization degree of 0.1~20×104 mg/L in percentage by weight; stirring for 0.5~1.0 h to ensure sufficient solving and uniform mixing; adding 0.25% of water-soluble surfactant, 0.45% of oil-soluble surfactant, 0.05% of lipophilic colloidal particles and 0.05% of carrying agent to the prepared mineralized water in sequence, and stirring for 0.5~3.0 h to ensure that various components are sufficiently solved and uniformly mixed, thereby completing the preparation of the in-situ emulsification and viscosity increase system with a high phase change point.

Embodiment 1 Oil-Water Interfacial Tension of In-Situ Emulsification and Viscosity Increase System with High Phase Change Point Table 1 Stable interfacial tension between an in-situ emulsification system with a high phase change point and crude oil

TABLE 1

| Mineralization degree (104 mg/L) | Crude oil viscosity (mPa · s) | Oil-water interfacial tension (mN/m) |
|---|---|---|
| 0.1 | 60.8 | 0.036 |
| 1.0 | 120.1 | 0.072 |
| 10 | 303.6 | 0.043 |
| 20 | 460.7 | 0.055 |

Mineralized water ① with a total mineralization degree of 0.1×104 mg/L, mineralized water ② with a total mineralization degree of 1.0×104 mg/L, mineralized water ③ with a total mineralization degree of 10×104 mg/L, and mineralized water ④ with a total mineralization degree of 20×104 mg/L (the mass concentrations of Ca2+ and Mg2+ in ① to ④ is 5.0% of the total mineralization degree respectively) are prepared, respectively, and stirred for 1.5 h. 0.25% of petroleum sulfonate, 0.45% of propylene glycol monostearate, 0.05% of liquid paraffin, and 0.05% of carboxymethyl-β-cyclodextrin are added into ① in sequence; 0.25% of cocamidopropyl betaine, 0.45% of polyoxyethylene sorbitan monostearate, 0.05% of graphite powder, and 0.05% of chitosan quaternary ammonium salt are added into ② in sequence; 0.25% of fatty alcohol ether sulfonate, 0.45% of oleic diethanolamide, 0.05% of graphite powder, and 0.05% of xanthan gum are added into ③ in sequence; 0.25% of alkanolamide, 0.45% of dodecylamine, 0.05% of polyhedral oligomeric silsesquioxane, and 0.05% of guar gum are added into ④ in sequence; and the mixture is stirred for 2.0 h to obtain the in-situ emulsification and viscosity increase system with a high phase change point.

The solution ③ is observed with an optical microscope, and it can be seen that lipophilic colloidal particles are uniformly dispersed in a liquid phase, as shown in FIG. 1. The interfacial tensions between the in-situ emulsification and viscosity increase system with a high phase change point and four kinds of degassed crude oils (the viscosities are 60.8 mPa·s, 120.1 mPa·s, 303.6 mPa·s and 460.7 mPa·s, respectively) are measured with a TX500C spinning drop interfacial tensiometer at 80° C. for 2 h, to obtain a stable interfacial tension value. Under the condition of 0.1~20×104 mg/L mineralized water, the system can keep the interfacial tension of oil and water at the order of 10-2 mN/m, which shows a good performance of reducing the oil-water interfacial tension. The results are shown in Table 1.

Embodiment 2 Viscosity of Emulsion Formed by the In-Situ Emulsification and Viscosity Increase System with High Phase Change Point and Crude Oil Mineralized water ① with a total mineralization degree of 0.1×104 mg/L, mineralized water ② with a total mineralization degree of 1.0×104 mg/L, mineralized water ③ with a total mineralization degree of 10×104 mg/L, and mineralized water ④ with a total mineralization degree of 20×104 mg/L (the mass concentrations of Ca2+ and Mg2+ in ① to ④ is 5.0% of the total mineralization degree respectively) are prepared, respectively, and stirred for 1.5 h. 0.25% of petroleum sulfonate, 0.45% of propylene glycol monostearate, 0.05% of liquid paraffin, and 0.05% of carboxymethyl-β-cyclodextrin are added into ① in sequence; 0.25% of cocamidopropyl betaine, 0.45% of polyoxyethylene sorbitan monostearate, 0.05% of graphite powder, and 0.05% of chitosan quaternary ammonium salt are added into ② in sequence; 0.25% of fatty alcohol ether sulfonate, 0.45% of oleic diethanolamide, 0.05% of graphite powder, and 0.05% of xanthan gum are added into ③ in sequence; 0.25% of alkanolamide, 0.45% of octadecyl primary amine, 0.05% of polyhedral oligomeric silsesquioxane, and 0.05% of guar gum are added into ④ in sequence; and the mixture is stirred for 2.0 h to obtain the in-situ emulsification and viscosity increase system with a high phase change point. The in-situ emulsification and viscosity increase system with a high phase change point and the crude oil are configured at a ratio of 3:7, 4:6, 5:5, 6:4, 7:3, 8:2, and 9:1 (the water contents are 30%, 40%, 50%, 60%, 70%, 80%, 90% in sequence), sealed and placed in an oil bath pan with a magnetic stirring device; and then stirred for 1 h at an oil bath condition of 90° C. while observing the emulsification. After the stirring is completed, a temperature condition of the oil reservoir is simulated with a high-temperature and high-pressure Hack rheometer to test the emulsion's viscosity, see Tables 2~5.

Under the oil reservoir temperature condition (60~120° C.), the viscosity of the mineralized water is 0.34~0.75 mPa·s, and the difference in fluidity of water and heavy oil exhibits great. The in-situ emulsification and viscosity increase system and formation crude oil form a water-in-oil emulsion under a dynamic action. When the water content is ≥70%, high-internal-phase Pickering water-in-oil and water-in-oil emulsions each having a relatively high viscosity are formed. The dense accumulation of large- and small-scale emulsions in a three-dimensional space does not conform to Ostwald's pure geometric theory. In addition, the viscosity of the emulsions in the entire range of water content is 1.2~3.5 times of the viscosity of heavy oil, which reflects good fluidity and excellent flow control ability of the emulsions. The particle size of the water-in-oil emulsion with a water content of 70% is shown in FIG. 2. Large- and small-scale emulsions are densely accumulated in a three-dimensional space.

TABLE 2

Viscosity of emulsions with different water-oil ratios under the condition of water mineralization degree of 0.1 × 104 mg/L

| Oil-water ratio | Viscosity (mPa · s) |
| --- | --- |
| 3:7 | 523.7 |
| 4:6 | 569.8 |
| 5:5 | 698.2 |
| 6:4 | 726.9 |
| 7:3 | 789.2 |
| 8:2 | 836.9 |
| 9:1 | 667.1 |

Test temperature: 60° C. Viscosity of degassed crude oil: 460.7 mPa · s

TABLE 3

Viscosity of emulsions with different water-oil ratios under the condition of water mineralization degree of 1 × 104 mg/L

| Water-oil ratio | Viscosity (mPa · s) |
| --- | --- |
| 3:7 | 408.2 |
| 4:6 | 498.7 |
| 5:5 | 579.2 |
| 6:4 | 698.2 |
| 7:3 | 897.2 |
| 8:2 | 632.3 |
| 9:1 | 501.4 |

Test temperature: 80° C. Viscosity of degassed crude oil: 303.6 mPa · s

TABLE 4

Viscosity of emulsions with different water-oil ratios under the condition of water mineralization degree of 10 × 104 mg/L

| Water-Oil ratio | Viscosity (mPa · s) |
| --- | --- |
| 3:7 | 185.2 |
| 4:6 | 234.6 |
| 5:5 | 278.9 |
| 6:4 | 302.1 |
| 7:3 | 370.8 |
| 8:2 | 320.1 |
| 9:1 | 298.7 |

Test temperature: 90° C. Viscosity of degassed crude oil: 120.1 mPa · s

TABLE 5

Viscosity of emulsions with different water-oil ratios under the condition of water mineralization degree of 20 × 104 mg/L

| Oil-water ratio | Viscosity (mPa · s) |
| --- | --- |
| 3:7 | 79.2 |
| 4:6 | 90.9 |
| 5:5 | 120.6 |
| 6:4 | 110.2 |
| 7:3 | 140.9 |
| 8:2 | 187.1 |
| 9:1 | 102.7 |

Test temperature: 104° C. Viscosity of degassed crude oil: 60.8 mPa · s

Embodiment 3 Enhanced Oil Recovery Performance of In-Situ Emulsification and Viscosity Increase System with High Phase Change Point Mineralized water with a mineralization degree of 20×10⁴ mg/L (the mass concentrations of $Ca^{2+}$ and $Mg^{2+}$ are 5.0% of the total mineralization degree) and stirred for 1 h, added with 0.25% of alkanolamide, 0.15% of octadecyl primary amine, 0.30% of oleic diethanolamide, 0.05% of polyhedral oligomeric silsesquioxane, and 0.05% of xanthan gum, and stirred for 2.0 h to obtain the in-situ emulsification and viscosity increase system with a high phase change point. An artificial simulated core (45×45×300 mm long core, with a porosity of 25% and a gas permeability of 2.0 mL/min) is prepared under the conditions that the temperature is 90° C., the viscosity of crude oil is 60.8 mPa·s, and the original oil saturation is 72%. In the water flooding stage (water flooding speed of 2.0 mL/min), affected by an unfavorable water-oil mobility ratio, the crude oil produced by water flooding has a low degree of recovery, with a recovery rate of about 40% under a water recovery rate of 98%. Subsequently, the in-situ emulsification and viscosity increase system with a high phase change point is injected (at an injection rate of 2.0 mL/min). During the injection of the system, the injection pressure increases and the remaining oil in the core is restarted. A water-in-oil emulsion is observed at the outlet end, and a high-internal-phase water-in-oil emulsion is still formed even under a high water-content condition. The water-in-oil emulsion has excellent flow control ability, good fluidity and spreadability in porous media. On the other hand, the in-situ emulsification and viscosity increase system with a high phase change point has extremely strong oil washing ability, such that the recovery rate of crude oil is greatly increased to 42% under the synergistic effect therebetween, and the cumulative recovery rate is up to 83%. The displacement effect is shown in FIG. 3.

The invention claimed is:

1. An in-situ emulsification and viscosity increase system, consisting of the following components in percentage by weight:

0.2-0.5% of a water-soluble surfactant, wherein the water-soluble surfactant is a combination of petroleum sulfonate, cocamidopropyl betaine, fatty alcohol ether sulfonate, alkanolamide and alkyl glycoside;

0.2-1.5% of an oil-soluble surfactant, wherein the oil-soluble surfactant is one of or a combination of propylene glycol monostearate, fatty glyceride, polyoxyethylene sorbitan monostearate, oleic diethanolamide, dodecylamine, octadecyl primary amine, sodium oleate and petroleum acid;

0.02-0.5% of lipophilic colloidal particles, wherein the lipophilic colloidal particles are one of liquid paraffin and polyhedral oligomeric silsesquioxane;

0.02-0.2% of a viscosifier, wherein the viscosifier is one of carboxymethyl-β-cyclodextrin, chitosan quaternary ammonium salt, chitosan hydrochloride and guar gum; and the balance of mineralized water.

2. The in-situ emulsification and viscosity increase system according to claim 1, wherein the water-soluble surfactant has an oil-water interfacial tension reaching the order of $10^{-2}$ mN/m.

3. An application of the in-situ emulsification and viscosity increase system according to claim 1, the application comprising applying the in-situ emulsification and viscosity increase system in water-flooding oil reservoirs, wherein the properties of the oil reservoirs are as follows: the temperature is up to 120° C., the mineralization degree of mineralized water is up to 20×10⁴ mg/L, and the viscosity of formation crude oil is less than 500 mPa·s.

* * * * *